United States Patent

[11] 3,536,014

[72] Inventors Louis G. Kuchuris
860 Lake Shore Drive, 60611;
Frank E. Ouradnik, 6324 South Campbell
Ave., Chicago, Illinois 60629
[21] Appl. No. 699,401
[22] Filed Jan. 22, 1968
[45] Patented Oct. 27, 1970
[73] Assignee Said Ouradnik assignor to said Kuchuris

[54] MECHANISM FOR IMPARTING DESIGN TO BAKERY PRODUCT
4 Claims, 10 Drawing Figs.
[52] U.S. Cl. .................................................. 107/8,
107/9, 107/15
[51] Int. Cl. ........................................... A21c 11/04
[50] Field of Search ............................ 107/4.2,
4.3, 4.4, 68, 69, 8.35, 8.9, 8.94, 15.5, 15.7, 54.28,
4.5, 4.35, 8.4, 9, 9.4, 9.8, 15, 15.1, 54, 54.1, 54.2;
31/5, 7, 10; 17/32

[56] References Cited
UNITED STATES PATENTS
954,186    4/1910   Hoffman .................. 107/8.(9)UX
1,291,168  1/1919   Ruger ..................... 107/8.(9)UX
2,617,370  11/1952  Martka .................... 107/8.(9)UX
2,690,142  9/1954   Whitehead ............... 107/68X
642,220    1/1900   Green ..................... 107/68
2,212,991  8/1940   Sobel ..................... 107/8.(9)UX
2,878,564  3/1959   Strate ..................... 107/8.(9)UX
3,302,592  2/1967   Werner ................... 107/68
3,417,713  12/1968  Schwebel ................ 107/68X FOREIGN PATENTS
232,510    12/1909  Germany ................. 107/8.9
304,532    1/1933   Italy ....................... 107/8.9

Primary Examiner—Edward L. Roberts
Attorney—Hofgren, Wegner, Allen, Stellman and McCord ABSTRACT: An attachment for a dough forming machine of the type which forms dough into small disc or ball-like masses which, upon subsequent baking, are formed into rolls, hamburger buns or the like, the attachment being in the nature of a scoring or imprinting device for disfiguring the wads of dough such that, upon subsequent baking, the resultant bakery product will bear a distinct design on the upper and lower surfaces thereof.

Patented Oct. 27, 1970

Inventors
Louis G. Kuchuris
Frank E. Ouradnik
By: Hofgren, Wegner, Allen,
Stellman & McCord
Attorneys Patented Oct. 27, 1970
3,536,014
Sheet 2 of 3
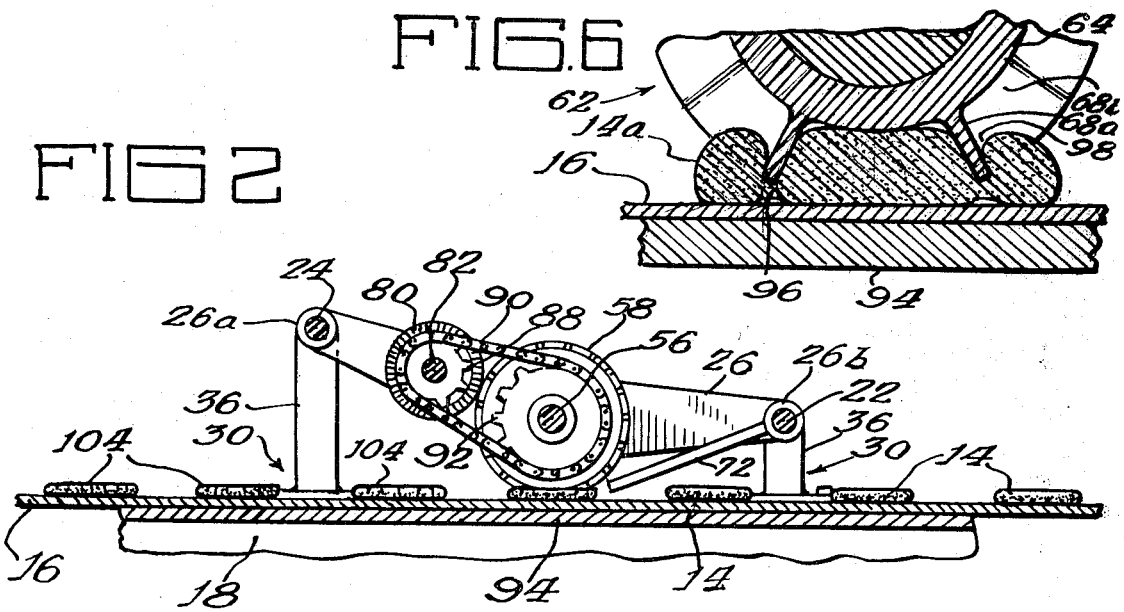
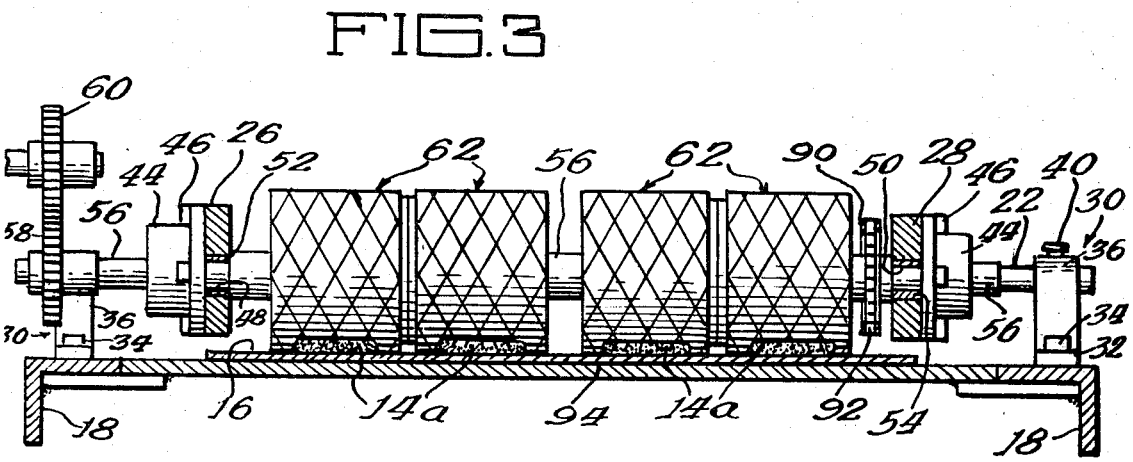
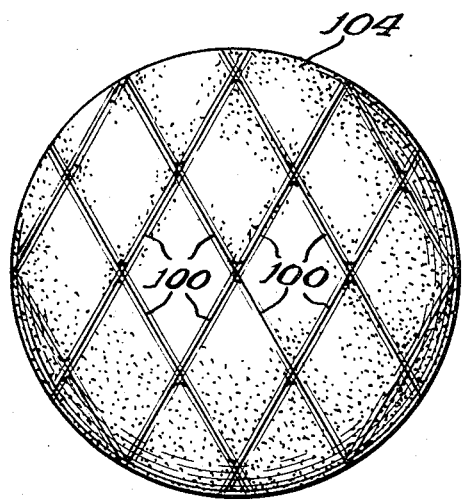
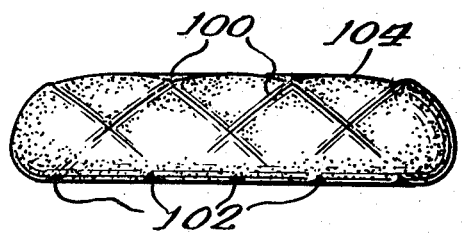

Patented Oct. 27, 1970 3,536,014

MECHANISM FOR IMPARTING DESIGN TO BAKERY PRODUCT

BACKGROUND OF THE INVENTION

1. Field of the Invention

This invention relates to improvements in bakery apparatuses and particularly to an attachment for imparting a design in wads of dough, prior to baking so that the resultant bakery product will retain the design on the exterior thereof.

2. Description of the Prior Art

Generally bakery products, such as hamburger buns, hot dog buns, and dinner rolls, are produced by first being molded into small disc or ball-like masses or wads of dough in a machine which automatically forms these wads of dough and feeds them outwardly along a moving belt, from which the wads of dough may be deposited into pans having a plurality of separate compartments. The pans having the small wads of dough in each compartment are then placed in the oven and, as the dough is baked, it rises and assumes the configuration of a hamburger bun, dinner roll, or the like. A suitable machine for so forming the dough is commonly referred to a "Pan-O-Mat" machine manufactured by AMF Industries.

Generally speaking, the exterior of bread products such as hamburger or hot dog buns is substantially smooth. Occasionally decorative food matter such as caraway seeds may be deposited on the top of the bun, but the bun still remains a basically uninterrupted smooth ovoid. A substantial amount of bakery products are produced for commercial food serving establishments, including hotels, restaurants, and drive-in hamburger stands. Many of these establishments have distinctive symbols or trade or service marks which identify the origin of the goods and services to the consumer. It has been found that these commercial food servers are desirous of having a symbol or mark indicative of their goods and services imparted to the consumable product. In the case of hotels or restaurants, the dinner rolls which usually accompany a meal are suitable vehicles for the symbol or mark. In the case of a drive-in stand, the hamburger or hot dog bun is an ideal consumable conveyor of the symbol or mark.

Some rolls which have heretofore been formed with a design of some nature, have been formed either by hand or by a rather lengthy mechanical process. For example, knotted dinner rolls and other types of braided rolls are made by hand. The so-called "clover-leaf" rolls are first formed by the physical separation of a wad of dough into two or three pieces. Following this the separate pieces of dough are separately deposited in a common receptacle of a pan, and the dough partially knits back together during the baking period.

Some attempts have been made to imprint a design on the top surface of a roll, but so far as is known to applicants, these attempts have taken the form of a reciprocated die which imprints a design on the top surface of the roll after the roll has been placed in a pan prior to baking. Other efforts have been made along the lines of a manually actionable rotating printing element which imprints a design on pieces of dough which are singly fed through the element. However, there has been no satisfactory means provided for imprinting a design on wads of dough as they are fed outwardly from an automatic dough forming machine so that the design can be imprinted as a normal incident to the dough forming stage and without requiring separate manual or mechanical stations where some additional act may need be performed which interrupts the usual flow of the baking process.

SUMMARY OF THE INVENTION

This invention is directed, in brief, to the provision of a means for automatically imparting a design to a wad of dough prior to the baking thereof so that the resultant baked product will be provided with a design on the exterior thereof, this means being adapted for incorporation in currently available automatic dough forming machines such that this design impressing step can take place as part of an operation in the normal flow of the baking process. The best mode currently contemplated by the inventors for carrying out the invention is the provision of ganged scoring wheels across the path of travel of dough balls outwardly from a dough forming machine, the wheels being driven by a power takeoff from the main drive of the dough forming machine which operates the moving belt upon which the dough balls are fed outwardly, and a platen or hard surface under the belts generally in registration with the wheels so that as the dough balls are fed outwardly from the machine on the moving belt they will be fed under the wheels, scored and fed therebeyond into baking pans to be baked.

BRIEF DESCRIPTION OF THE DRAWINGS

FIG. 2 is a fragmentary sectional view taken generally along the line 2–2 of FIG. 1;

FIG. 3 is a fragmentary sectional view taken generally along the line 3–3 of FIG. 1;

FIG. 4 is a top plan view of a hamburger bun made as the result being subjected to the device of this invention;

FIG. 5 is a side elevational view of a hamburger bun shown in FIG. 4;

FIG. 6 is a fragmentary enlarged sectional view through a scoring wheel and a dough wad showing the scoring action of the wheel as a wad of dough is fed thereunder;

DESCRIPTION OF THE PREFERRED EMBODIMENT

Figure 1:
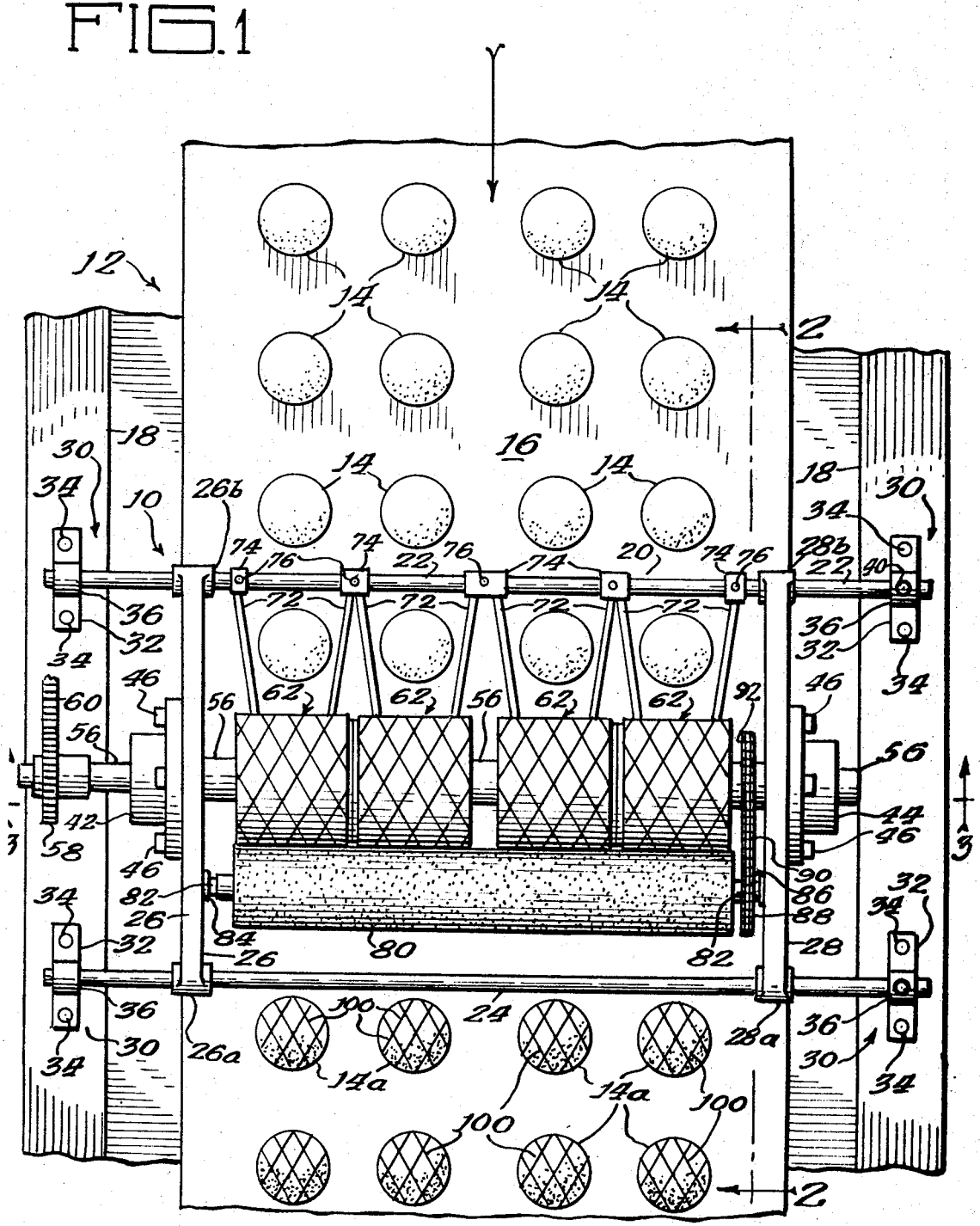
FIG. 1 is a fragmentary top plan view of the device of this invention shown as attached to the outfeed portion of a commercially available dough forming machine.

The attachment 10 of this invention is intended for use in a well known dough forming machine 12 such as that commonly known in the art as a "Pan-O-Mat" machine made by AMF Industries. Briefly, such dough forming machines form discs, balls or wads of dough 14 which are fed outwardly on a driven outfeed belt 16 supported in framing structure 18 of the machine. The purpose of the attachment 10 of this invention is to score dough wads 14 so that the scored wads 14a will, following subsequent baking, result in a bread like product having a decorative exterior design.

The attachment 10 of this invention includes frame means 20 defined by spaced parallel cross rods 22 and 24, preferably made of steel or other suitable rigid material, and by parallel spaced end bars 26 and 28, also preferably made of steel or similarly rigid material, forming a generally boxlike frame. Opposite ends of the end bars 26 and 28 are provided with through bores 26a, 26b and 28a, 28b, respectively, through which rods 22 and 24 extend, respectively, with portions of each of the rods projecting outwardly beyond each of the end bars 26 and 28.

Means are provided for securing the attachment 10 to the frame 18 of a dough forming machine 12. In the illustrated embodiment this means takes the form of stanchions 30, each having a base portion 32 secured to the framing 18 by suitable fastening means 34. An upright portion 36 extends upwardly from base 32 and is provided with a rod receiving notch 38 for receiving the ends of rods 22 and 24. The rods may be locked to the upright by means of a locking cap screw 40, thus securing the framework 20 of the attachment 10 to the framework 18 of the dough forming machine 12, such that the attachment 10 is placed across the path of outfeed travel of the dough balls 14.

Each of the ends of frame bars 26 and 28 has generally centrally positioned hubs 42 and 44 attached thereto by suitable fastening means 46. The hubs have a through bore (not shown) in alignment with through bores 48 and 50 of each of end bars 26 and 28, respectively, with each of the through bores 48 and 50 having bearings 52 and 54 for rotatably mounting reduced portions 56a and 56b, respectively of a drive shaft 56 in the frame 20.

One end of the drive shaft 56 has a main drive gear 58 fixed thereon. Gear 58 receives power from the main drive of the dough forming machine 12 to rotate shaft 56, such as by means of connection by a chain 60 or other suitable drive arrangement. Shaft 56 is rotated in the same direction of movement as that of belt 16 and, preferably, at the same general rate of speed as belt 16.

Figure 7:
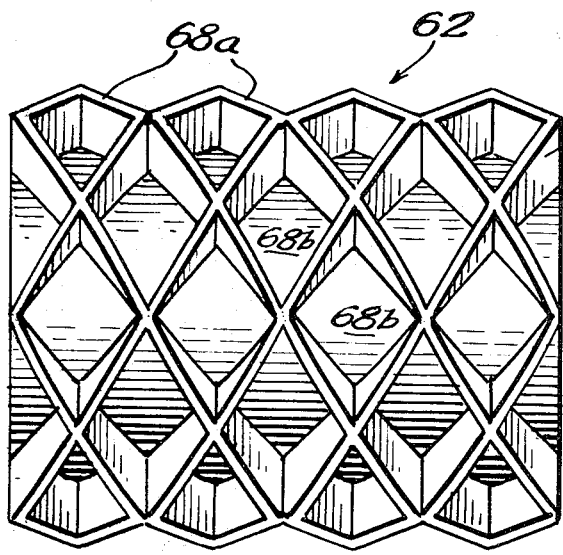
FIG. 7 is an enlarged front elevational view of a scoring wheel used with the device of this invention.
Figure 8:
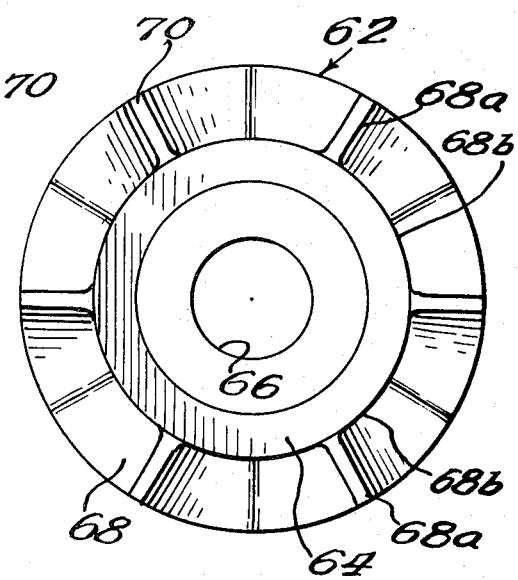
FIG. 8 is a side elevational view of the wheel shown in FIG. 7.
Figure 9:
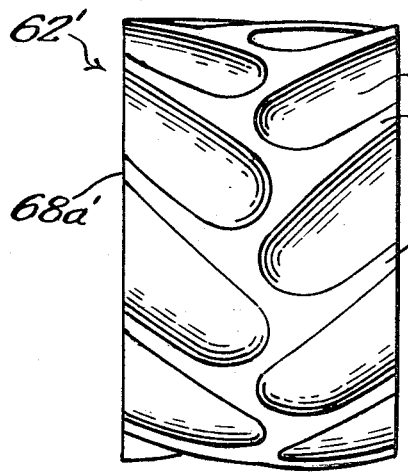
FIG. 9 is a front elevational view of another form of a scoring wheel which may be used with the device of this invention.
Figure 10:
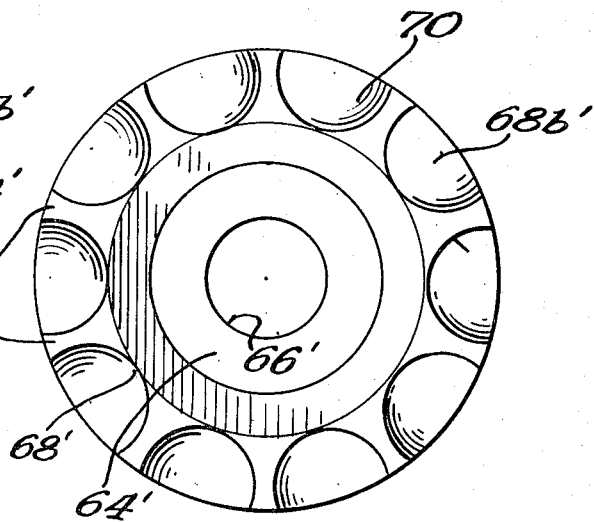
FIG. 10 is a side elevational view of the wheel shown in FIG. 9.

Drive shaft 56 has fixed thereon a plurality of design imparting or imprinting wheels such as wheels 62 shown in FIGS. 1, 7 and 8 or wheel 62' shown in FIGS. 9 and 10. In the illustrated embodiment, the wheels are ganged across the drive shaft 56 in a group of four wheels to handle four rows of dough wads fed outwardly in series from the dough forming machine. Each wheel 62 or 62' has a central base or hub 64 or 64'; respectively preferably cast of a heavy metal and a through bore 66 or 66' for receiving a mounting means such as shaft 56. Suitable means, such as a set screw or the like (not shown), may be provided for fixing each wheel 62 on shaft 56. An alternative arrangement (not shown) is for shaft 56 to be nonrotative and for wheels 62 to be rotatably mounted on the shaft.

A tubular sleeve 67, having outer periphery 68, is fitted over hub 64. The annular periphery 68 or 68' of each wheel 62 or 62' has scoring or imprinting surfaces including raised portions or ribs 68a or 68a', and recessed or relieved portions 68b or 68b' respectively, preferably formed in a geometric pattern, such as the diamond pattern shown in FIGS. 7 and 8. It is to be understood that different patterns could be formed on the wheel periphery depending on the symbol or mark to be formed in the dough. Preferably the ribs project outwardly a distance sufficient to cut well into a dough wad so that upon return flow of the dough following relative withdrawal of the ribs, a score line will remain in the exterior surface of the dough. In the preferred embodiment the ribs extend approximately five eighths inches radially outwardly which is sufficient to cut through most dough wads when the wheels 62 are positioned generally in tangential contact with belt 16. It has also been found desirable to coat the exterior of the wheels 62 or 62' with a suitable release material 70, such as that sold under the trade mark "Teflon", the coating being of a depth of about .005 inches in the preferred embodiment. This coating eliminates problems of adherence between the dough and the wheels.

Guide means are also provided for directing each dough wad under each wheel 62. In the illustrated embodiment these guide means take the form of fingers 72 which are fixed to sleeves 74 secured on rod 22 by suitable means such as a cap screw 76 or the like. The fingers diverge slightly inwardly toward each other in the direction of the wheels to serve as a means for channeling each dough wad 14 generally centrally under each wheel 62 as the dough wads are fed along the conveyor belt 16.

A reduced roller 80 is mounted within the frame 20 and includes shaft 82 which is rotatably mounted within inwardly facing hubs 84 and 86 fixed to the interior of each of the end bars 26 and 28, respectively. Hubs 80 and 82 are vertically and laterally offset with respect to the through bores 48 and 50 through which the main drive shaft 56 is mounted so that shaft 82 is above and ahead of shaft 56. Roller shaft 82 is provided with gear 88 on the one end thereof which, by means of chain 90, which extends around gear 88 and also gear 92 on drive shaft 56, transmits rotative drive to the shaft 82 of roller 80 from the drive shaft 56. Preferably roller 80 is a brush which has surface contact with the several wheels 62 on shaft 56. This serves both to clean the wheels 62 and thereby minimize the amount of dough and flour which will build up on the wheels and also serves to keep any occasional dough wads 14 from adhering to the wheels 62 and revolving around with the wheels.

A hard surface or suitable platen means 94 is provided beneath the surface of belt 16 under the area of the wheels 62 to provide a backing surface for the scoring or imprinting action of the wheels 62.

In operation, as the dough wads advance along the surface of belt 16 after being fed outwardly from the dough forming machine, such as in rows four abreast as illustrated, they arrive at the area where the wheels 62 have generally tangential contact with the belt 16. As illustrated in FIG. 6, the raised or rib portions 68a of the wheel 62 willl cut the dough wads through from top through bottom, forming through grooves 96 and 98, and leaving indentations 100 in the top and 102 in the bottom in the imprinted dough pads 14a which are advanced outwardly from the imprinting wheel 62.

As illustrated in FIGS. 4 and 5, after the wads of dough have been baked so that they are raised to the desired size and configuration of the intended product, such as a hamburger bun, the resultant baked product or bun 104 still retains surface indentations 100 and 102 with the top and bottom thereof generally following the geometric pattern of the wheel 62. However, the intermediate areas previously cut completely through merge together during the baking process so that the bun itself remains an integral unit with only the surface indentations 100 and 102 in the upper and lower surfaces thereof, respectively.

Generally a normal smooth hamburger bun is produced from a batter which comprises 500 pounds of flour mixed with 200 pounds of water. It has been found that a slight change in this mixture produces a more desirable bun for the purposes of retaining the design therein. One suitable mixture is that of 175 pounds of water with 500 pounds of flour. With this latter mixture, both the commercial dough forming machines, and the design imparting attachment of this invention, can work with optimum effect on the dough, and the design imparted to the dough will always be retained therein after transfer of the dough to an oven and following baking thereof into a bun or similar bread like product.

Printing wheels such as wheel 62 could be formed from a suitable hard plastic such as "Teflon". The hub portion 64 would be machined to form a smooth cylindrical outer diameter and bored to provide the bore 66 for receiving the drive shaft 56. Tubular plastic material would be utilized to form the sleeve 67 and after being suitably machined or the like, would be telescoped over the hub 64. The circumference of sleeve 68 would then be machined to provide the scoring or imprinting surfaces such as the ribs 68a and relieved portions 68b. The sleeve 67 could be secured to the hub 64 by drilling a hole through the sleeve and hub and inserting a securing pin therein. By forming the wheel 62 in this fashion, the necessity for adding the coating of release material would be eliminated since the entire wheel would be formed of "Teflon" or other suitable plastics having release properties.

This invention provides an imprinted bun or roll product and a dough imprinting means which may be easily incorporated into existing dough forming machines so that a desired design may be imprinted in a dough wad at a point in the normal outfeed path of travel of the dough wads. The particular embodiment illustrated comprises an easily mounted attachment so that a dough forming machine may be converted to and from a design imparting function in minutes. Depending on particular customer desires, different design wheels may be utilized to impart different symbols or marks. The imparted design may show in both the upper and lower faces of the resultant bread product with the intermediate portions thereof being integrally joined.

The foregoing detailed description has been given for clearness of understanding only, and no unnecessary limitations should be understood therefrom, for some modifications will be obvious to those skilled in the art.

We claim:

1. For use with a dough forming machine of the type wherein wads of dough are formed in predetermined masses and fed outwardly from the machine on a moving surface, a design imparting attachment for connection to the dough forming machine over the conveyor portion thereof for imparting a design to the exterior of the dough mass for disfiguring the same, comprising: means defining an attachment frame having forward and rear members and spaced side members; a forming wheel shaft journaled for rotation in the frame between said side members, the forming wheel shaft including an extension having drive transmitting means thereon for connection to a power takeoff of a dough forming machine to drive the forming wheel shaft thereby; a plurality of dough forming wheels mounted on the shaft in a position to intersect the path of travel of dough masses fed outwardly on the conveyor to disfigure the masses and impart a design thereto, the dough forming wheels including scoring surfaces for separating portions of the dough masses and imparting the design thereto; means on said frame for attachment to a dough forming machine; and a plurality of dough mass guiding fingers fixed on the rear frame member and extending forwardly of the guide finger mounting shaft toward the forming wheels and positioned to lie closely adjacent to the conveyor surface when the apparatus is mounted on the dough forming machine to guide dough masses towards individual forming wheels on the forming wheel shaft.

2. The apparatus of claim 1 including a forming wheel cleaning element mounted on a shaft journaled between the sides of the frame with the cleaning member in generally peripheral engagement with the forming wheels, and means interconnecting the forming wheel shaft and the cleaning element shaft for driving the cleaning element shaft responsive to rotation of the forming wheel shaft.

3. The apparatus of claim 2 wherein the frame rear members extend beyond the side members to provide portions for connection to a dough forming machine.

4. The apparatus of claim 3 wherein the guide fingers are provided in pairs of forwardly converging members associated with each forming wheel on the forming wheel shaft.